United States Patent [19]

Porcher et al.

[11] Patent Number: 4,639,891
[45] Date of Patent: Jan. 27, 1987

[54] SIGNALS PATH CONTROL CIRCUITRY FOR A DATA TERMINAL

[75] Inventors: Thomas C. Porcher, Stow, Mass.; Morgan E. Robinson, Hanover, N.H.

[73] Assignee: Digital Equipment Corporation, Maynard, Mass.

[21] Appl. No.: 551,010

[22] Filed: Nov. 14, 1983

[51] Int. Cl.⁴ .............................................. G06F 3/04
[52] U.S. Cl. ............................................ 364/900
[58] Field of Search ... 364/200 MS File, 900 MS File

[56] References Cited

U.S. PATENT DOCUMENTS

| | | | |
|---|---|---|---|
| 3,693,166 | 9/1972 | Rawson et al. | 364/200 |
| 4,047,159 | 9/1977 | Boudry | 364/200 |
| 4,245,343 | 1/1981 | Frey | 364/900 |
| 4,276,611 | 6/1981 | Jansen et al. | 364/900 |
| 4,365,293 | 12/1982 | Holtz | 364/200 |
| 4,405,978 | 9/1983 | Lange et al. | 364/200 |
| 4,460,957 | 7/1984 | Eggebrecht et al. | 364/200 |

*Primary Examiner*—Gareth D. Shaw
*Assistant Examiner*—Kevin A. Kriess
*Attorney, Agent, or Firm*—William E. Cleaver

[57] ABSTRACT

The present invention is related to clearing a communication path and in the alternative blocking said communication path between a data terminal and a main data processor, when it appears, from said terminal end, that the data path into the main computer is blocked by some system irregularity in a first case, or should be blocked because of a data overflow condition, in a second case. The present system employs a pair of buffers, the first of which is connected in said communication path, while the second buffer is connected in a data path along which data signals are transmitted from the main data processor. Said communication path includes first logic circuitry connected between said first buffer device and a UART which is connected to the main data processor. Said first logic circuitry can block or unblock the transmission of data to the main data processor. Second logic circuitry is connected between the second buffer and said UART. Said second logic circuitry includes monitoring circuitry which monitors signals coming from the main data processor so that if an "off" signal is transmitted, then a proper signal will be generated and sent to said first logic circuitry to block data transmission from said terminal.

9 Claims, 1 Drawing Figure

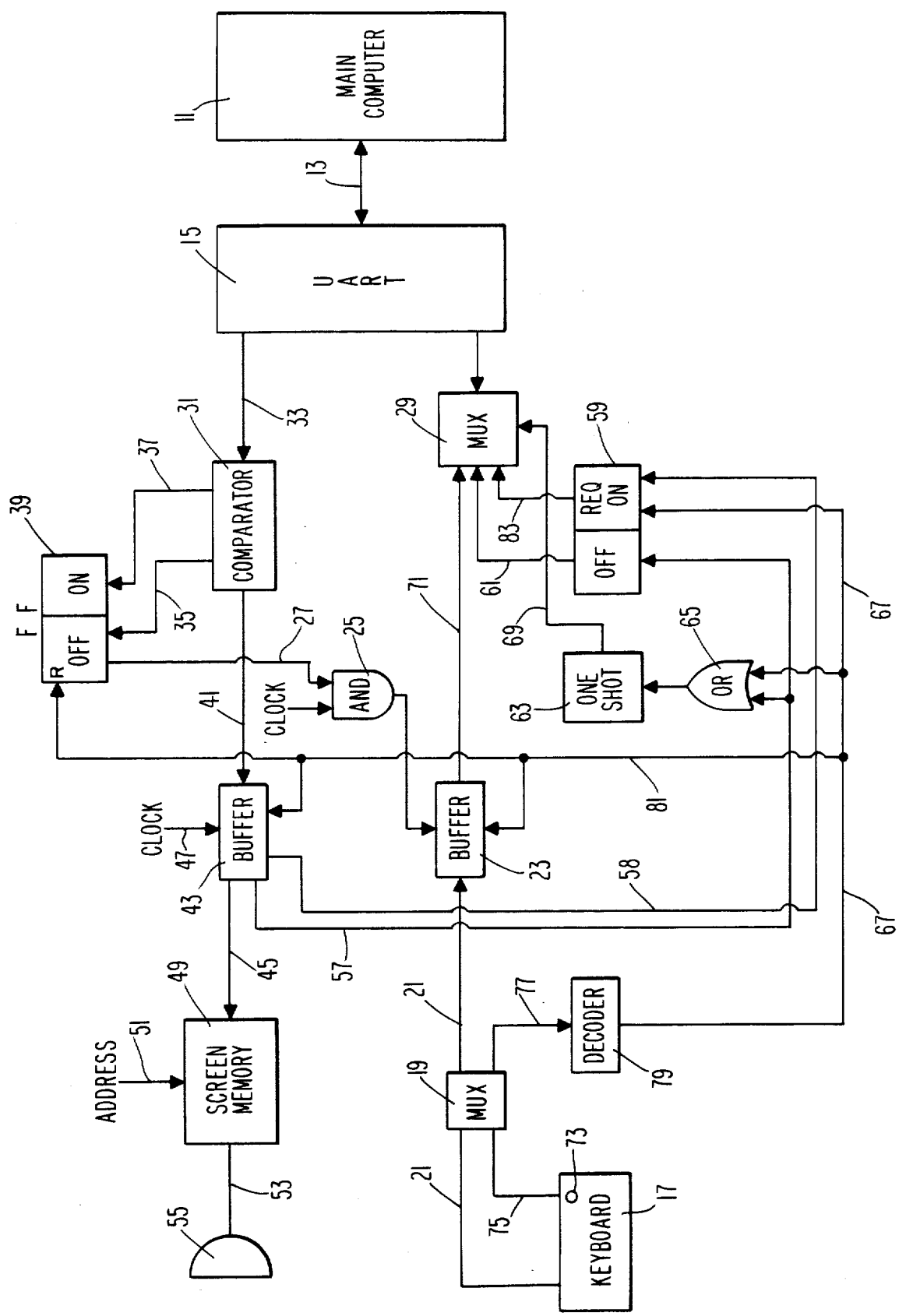

SIGNALS PATH CONTROL CIRCUITRY FOR A DATA TERMINAL

BACKGROUND OF THE INVENTION

In data processing systems, in particular those which employ data terminals, there is a great deal of data signal traffic flowing to and from a main data processor, often referred to as the host computer. Value safeguards and monitoring systems are included in such prior art systems so that the amount of data signal traffic does not exceed the capabilities of the system, either in time constraints or in data storage constraints or the like. One such safeguard resides in the ability of the main data processor to send either an "on" or an "off" signal. The "off" signal causes the data terminal to be effectively disconnected, while the "on" signal effectively connects the data terminal to the UART. However with such safeguards there have been problems, for instance, if through some system irregularity, (such as voltage drop, incorrect programming, sporadic failure of components, signal line noise or the like), an "off" condition can be effected in the terminal circuitry. If an "off" condition is spuriously created, then the terminal circuitry would be incapable of use until the problem is corrected, even though, in fact, there is no real basis for the "off" condition. In the prior art when an irregular condition is suspected, the terminal is "turned off" i.e. the power is turned off and thereafter restarted. While such a technique often causes the "off" condition to disappear it also means reloading information, going through an initialization series of steps, etc. The present system enables the user to clear a data transmission path and if an "off" condition is a local problem, no restarting procedure is necessary. The present system also permits data transmission to be blocked if the flow of data traffic is approaching the point of exceeding the capacity of the system.

SUMMARY OF THE INVENTION

The present system involves having a UART connected to the main data processor to handle the parallel to serial and serial to parallel conversions. Connected to the UART is data transmission path from the keyboard and this path includes a buffer controlled by a gate circuit and two MUX's. Data signals are transmitted from the keyboard, through one MUX to the buffer, from the buffer, under control of the gate circuit, through the other MUX to the UART. Also connected to the UART is a second data transmission path which includes an "on"-"off" comparator, with a flip-flop connected thereto to provide a means for remembering the on-off condition. In the second data transmission path, there is connected to the comparator a second buffer. The second buffer in turn is connected to a screen memory which further, in turn, is connected to a display device. Data signals are transmitted along the second data transmission path from the UART to the display device. When an "off" signal is transmitted from the main data processor, it is detected at the comparator which causes the flip-flop to produce an "off" signal. The off side of the flip-flop is connected to the gate circuit which controls the readout of the first buffer and this "off" signal acts to block that gate. In such a situation the terminal user may suspect that the "off" signal is spurious, or that the on-off flip-flop has been erroneously set, or for some other reason the user must be able to transmit. The user, in one embodiment, under such circumstances can depress a clear communications key on the terminal keyboard. In response to pressing the clear communications key, the keyboard sends signals to a decoder which provides a clear signal to both buffers and a reset signal to the on-off flip-flop. The buffers are cleared of the data that may be stored therein and the flip-flop is reset to the "on" side. At the same time the keyboard sends a "request for an on signal" to the main data processor. If the main data processor chooses to respond positively it will send an "on" signal which will be detected by the comparator and hence the on-off flip-flop will remain in the "on" position. While the gate is unblocked, i.e. in the "on" condition, the keyboard can transmit data to the main data processor. In addition the system has upper and lower threshold circuits, as part of the second buffer, so that in the event the second buffer is being loaded and is approaching its capacity, the second buffer will send a signal to the main data processor requesting an "off" signal. Alternatively, if the second buffer is loaded with data below the lower threshold, the second buffer will transmit a signal to the main data processor requesting an "on" signal.

The features and objects of the present invention will become better understood in view of the following discussion taken in conjunction with the drawing.

SUMMARY OF THE DRAWING

The only drawing referred to in the description is a schematic block diagram of the present invention.

Consider the drawing. In the drawing there is shown a main computer 11 which is connected through a bidirectional channel 13 to a UART 15. There is one main data path into the UART and one main data path out of the UART. The main data path into the UART commences with the keyboard 17 which has two channels connected to a MUX 19. The first of said channels 21 is connected from the MUX 19 to the buffer 23.

In a preferred embodiment, the keyboard 17 is a LK 201 manufactured by Digital Equipment Corporation, while the MUX 19 is made up of a number of LS 157's manufactured by Signetics Corporation and the buffer 23 is made up of a plurality of TDC 1030's manufactured by TRW Corporation. It should be understood that the buffer operation could be implemented by firmware which is activated by the keyboard.

The buffer 23 temporarily stores data information transmitted from the keyboard 17 and ultimately transmits that data information to the MUX 29 in response to a clock signal from gate 25. The gate 25 is conditioned or not conditioned to pass a clock signal in accordance with the presence or absence of a signal on line 27 which will be discussed hereinafter. The output from the buffer 23 is sent to the MUX 29 and therethrough to the UART 15 and on to the main computer 11.

The second transmission line commences at the UART 15 and the signals are transmitted therefrom to the comparator 31. The comparator 31 in a preferred embodiment is a plurality of LS 85's manufactured by Signetics Corporation. The signals being transmitted from the UART 15 on line 33 are coded signals and the comparator 31 monitors those coded signals. If those coded signals represent either an "off" or an "on" condition, then the comparator will respectively send signals on lines 35 and 37 to transfer the flip-flop 39 into either its "off" or "on" condition. When the flip-flop 39 is in its "off" condition, it transmits the blocking signal on line 27 to block the gate 25 as mentioned earlier.

If we return to considering the data flow from the UART 15, we find that information is transmitted through the comparator 31, along line 41 to the buffer 43. The buffer 43 temporarily holds the information passed thereto and transmits it therefrom, on line 45, in conjunction with output clock signals received on line 47. In a preferred embodiment the buffer 43 is made up of a number of TDC 1030's manufactured by TRW Corporation. There are no clock generators shown in FIG. 1. The provision of clock signals is well understood in the data processing art and need not be further discussed. The output signals on channel 45 are transmitted to the screen memory 49 (which may be a bit map memory) and those signals are located in the screen memory in accordance with address signals transmitted on line 51. The provision of address signals to a screen memory is well understood and no further discussion thereof is required in this presentation. Also, as is well understood, the screen memory provides pixel information on channel 53 to the display device 55.

Buffer 43 is designed to have upper and lower threshold circuits therein. The upper threshold circuit provides an output signal on line 57 when the buffer 43 is loaded to a point where it exceeds a predetermined threshold. The output signal on line 57 is transmitted to the encoder 59. The encoder 59 provides a group of signals from the "off" side on a line 61, to the MUX 29 to be transmitted to the main computer. The group of signals thus described acts as a request to the main computer, which request asks the main computer to cease transmitting to the terminal, i.e. cease transmitting over line 33. If the data in the buffer goes below the low threshold value, the buffer 43 will transmit a signal on line 58 to the "request on" side of the encoder 59. It should be noted that there is a one shot multivibrator 63 connected to the MUX 29, and the input signal to the one shot multivibrator 63 is from an OR gate 65. The inputs to the OR gate 65 are from the line 57 and from the line 67. When the upper threshold signal is applied on line 57 it is also transmitted to the OR gate 65, and it passes therethrough to transfer the monostable multivibrator to its unstable side. The output from the unstable side of the monostable multivibrator 63 is transmitted on line 69, to render the MUX 29 receptive to the signal on line 61. If the monostable multivibrator 63 has not so conditioned the MUX 29, then signals on channel 71, from the buffer 23, are permitted to pass through the MUX 29.

In the event that the system is in a "off" condition, thereby blocking the gate 25 and thereby rendering the data transmission line from the keyboard 17 through the UART 15 impassable, the user may suspect that the "off" signal, or the "off" condition, is a spurious (which can be created by a number of conditions). For instance, a low voltage condition or signal line noise may well place the flip-flop 39 in the "off" condition. In another instance, the UART may mishandle signals because of component failure and cause the flip-flop 39 to be in the "off" condition. In another instance, the threshold circuitry may have requested an "off" condition from the main computer when in fact none was necessary, and for a host of other reasons the user may suspect that the "off" condition is not a proper condition. In such a situation the user can depress the clear communication key 73 which is found on the keyboard 17 or effect a clear communication function through a series of key strokes (of particular keys) which cause firmware to transmit coded signals to accomplish the clear communications function. In response to depressing the key 73 a group of signals are transmitted on channel 75, through the MUX 19, along the channel 77 to the decoder 79. The decoder 79 in fact is used to decode many signals coming from the keyboard but for the purpose of the present discussion will only be decoding one set of signals. In a preferred embodiment the decoder 79 is a 2716 EPROM manufactured by Intel Corporation. The output from the decoder 79 is a signal transmitted along the channel 67 and therefrom along the channel 81 to the clear terminals on the buffers 23 and 43. The clear signal being received by the buffers 23 and 43 clears those buffers of any data that might be present therein. At the same time the clear signal on line 81 acts as a reset signal for the flip-flop 39. When the clear signal is present on line 81, the flip-flop 39 is transferred to its "on" side. When the flip-flop 39 is transferred to its "on" side, the blocking signal on line 27 is removed and hence the gate 25 is open to enable data flow through buffer 23 from the keyboard 17.

At the same time the signal on line 67 is transmitted to the OR gate 65, whose output transfers the monostable multivibrator 63, to its unstable side. When the monostable multivibrator 63 is in its unstable side it provides a signal on line 69 to open the MUX 29 to signals either on line 61 or on line 83. In the present example, the signal on line 67 will be transmitted to the "request on" side of the encoder 59 and hence a group of signals on line 83 will be transmitted through the MUX 29 and through the UART 15, to the main computer. This last mentioned group of signals will be decoded in the main computer to indicate that an "on" signal is requested by the terminal. If the main computer chooses to respond positively, an "on" signal will be transmitted through the UART 15 on line 33. The system in addition to resetting the buffers 23 and 43 and the flip-flop 39, requests the "on" signals so that in the event the spurious signal was somehow being generated and might be regenerated, the "on" signal from the main computer would eliminate that condition.

In view of the above discussion its apparent that the present system provides for detecting either an "on" or an "off" signal from the main computer, provides for remembering what condition the main computer requests, provides for blocking the transmission path from the keyboard in the event the main computer has requested an "off" condition, provides for requesting an "off" condition if the buffer in the transmission path to the display device becomes overloaded; provides for requesting an "on" signal condition if the buffer in the transmission path to the display device goes below a lower threshold; provides for a clear communication operation from the keyboard which operation provides signals to reset the buffers of each transmission path and to reset the flip-flop (and thus unblock the transmission path from the keyboard to the main computer) and in addition to request that the main computer provide an "on" signal. It should be further understood that the system clears the buffers 23 and 43, so that in the event that the transmission path is open there will be no problem in transmitting data therethrough insofar as buffer 23 is concerned nor would there be any problem in receiving information therethrough insofar as buffer 43 is concerned. It should also be understood that the user may suspect that the contents of buffer 43 has caused the spurious condition to begin with. While the above description and drawing refer to a clear communications key, it should be understood that a clear communication function, as described herein, can be accomplished by storing the correct instruction data in firmware and fetching the same therefrom, for instance by a series of key strokes. Such an arrangement is within the concept of this invention.

What is claimed is:

1. In a data terminal system which has a data output means including a data display means an output means memory and a keyboard means and which data terminal system is formed to receive from and send data signals to a main data processor, which main data processor transmits coded "on" and "off" signals to said data terminal system to control whether or not said data terminal system transmits signals to said main data processor, an arrangement to alternatively clear and block transmission of signals between said data terminal system and said main data processor comprising in combination: bidirectional signal conversion means formed to convert parallel signals to serial signals and alternatively to convert serial signals to parallel signals, said bidirectional signal conversion means coupled to receive from and send signals to said main data processor; first signal buffer means formed to have first clearing means which can cause said first signal buffer means to be cleared in response to a clear signal and connected to said output means memory to transmit signals thereto for display on said data display means; first logic circuitry including monitoring signal means connected to said bidirectional signal conversion means and to said first buffer means to receive signals to be passed to said first buffer means and monitor said last mentioned signals to detect said coded "on" and "off" signals should either be present; keyboard circuitry means including a clear communication signal means connected to said keyboard; second signal buffer means formed to have second clearing means which can cause said second signal buffer means to be cleared in response to a clear signal and connected to said keyboard circuitry means to receive signals from said keyboard and store the same for further transmission; second logic circuitry connected to said first logic circuitry, to said second buffer means and to said bidirectional signal conversion means to selectively pass data signals to said main data processor through said bidirectional signal conversion means; third circuitry means connected from said clear communication signal means to said first and second buffer means and to said first logic circuitry whereby, in response to a clear communication signal from said keyboard circuitry means, said third circuitry means transmits a clear signal to said first and second clearing means to clear said first and second buffer means and transmits a reset signal to said first logic circuitry to reset said monitor signal means to an "on" condition in the event said monitor signal means is in an "off" condition.

2. In a data terminal system, an arrangement to alternatively clear and block the communication path according to claim 1 wherein said first logic circuitry includes comparator means to detect the presence of said "on" signal and alternatively, said "off" signal.

3. In a data terminal system, an arrangement to alternatively clear and block the communication path according to claim 2 wherein said monitoring signal means includes a bistable circuit connected to said comparator means.

4. In a data terminal system, an arrangement to alternatively clear and block the communication path according to claim 1 wherein said second logic circuitry includes an AND gate with an output means connected to said second buffer and one input means adapted to receive clock signals and another input connected to said first logic to receive a blocking signal therefrom in response to said monitoring signal means detecting an "off" signal.

5. In a data terminal system, an arrangement to alternatively clear and block the communication path according to claim 1 wherein said keyboard circuitry includes first and second signal paths and a multiplexor means connected thereto and wherein said second signal buffer is connected through said multiplexor to said first signal path and said third circuitry means is connected through said multiplexor to said second signal path.

6. In a data terminal system, an arrangement to alternatively clear and block the communications path according to claim 1 wherein said third circuitry means includes a signal decoder means.

7. In a data terminal system, an arrangement to alternatively clear and block the communication path according to claim 1 wherein said second logic circuitry includes a signal encoder means and wherein in response to a signal from said third circuitry means said encoder means sends a request to said main computer requesting said main computer to generate an "on" signal.

8. In a data terminal system, an arrangement to alternatively clear and block the communication path according to claim 1 wherein said first signal buffer means includes means to generate an overload signal if the data stored in said first signal buffer exceeds an upper threshold value and wherein said second logic circuitry is connected to said first signal buffer to respond to said overload signal and request an "off" signal from said computer.

9. In a data terminal system, an arrangement to alternatively clear and block the communication path according to claim 1 wherein said first signal buffer means includes means to generate an underload signal if the data stored in said first signal buffer is below a lower threshold value and wherein said first signal buffer means is connected to said second logic circuitry to transmit said underload signal thereto whereby said second logic circuitry is formed to respond and request an "on" signal from said main computer.

* * * * *